United States Patent [19]

Tazawa et al.

[11] 4,004,428
[45] Jan. 25, 1977

[54] PROCESS FOR STABILIZING SOIL

[75] Inventors: Shunsuke Tazawa; Kazuo Okabe, both of Yokohama, Japan

[73] Assignee: Nitto Chemical Industry Co., Ltd., Tokyo, Japan

[22] Filed: Nov. 6, 1975

[21] Appl. No.: 629,605

[30] Foreign Application Priority Data

Nov. 8, 1974 Japan .............................. 49-128090

[52] U.S. Cl. ................................ 61/36 C; 106/74; 106/287 SS
[51] Int. Cl.² ........................................................ E02D 3/14
[58] Field of Search ................... 61/36 C, 1 R, 35; 166/294, 292; 427/136; 71/64 SC; 106/287 SS, 74; 260/DIG. 14

[56] References Cited

UNITED STATES PATENTS

| 2,025,948 | 12/1935 | Jorgensen | 166/292 |
| 2,238,930 | 4/1941 | Chamberlain et al. | 166/292 |
| 2,437,387 | 3/1948 | Hodgson | 61/36 |
| 3,180,098 | 4/1965 | Spencer | 61/36 B |
| 3,294,563 | 12/1966 | Williams | 106/74 |
| 3,306,756 | 2/1967 | Miller | 106/74 |

*Primary Examiner*—Paul R. Gilliam
*Assistant Examiner*—Alex Grosz
*Attorney, Agent, or Firm*—Cushman, Darby & Cushman

[57] ABSTRACT

In the stabilization of soil which comprises injecting into soil a mixture of (A) an aqueous sodium silicate solution and (B) at least one compound selected from the group consisting of chlorides, sulfates and nitrates of aluminum, magnesium and iron, and then gelling the injected mixture in soil, the formation of a large amount of the metal hydroxide precipitate on mixing the components (A) and (B) can be prevented by adding (C) at least one oxy acid selected from the group consisting of citric acid, tartaric acid and lactic acid to any one of the components (A) and (B).

4 Claims, No Drawings

PROCESS FOR STABILIZING SOIL

The present invention relates to a process for stabilizing soil with a silicate grout. More particularly, the invention pertains to a process for stabilizing soil which comprises injecting into soil a silicate grout consisting of a mixture of (A) an aqueous sodium silicate solution, (B) at least one compound selected from the group consisting of chlorides sulfates and nitrates of aluminum, magnesium and iron, and (C) at least one oxy acid selected from the group consisting of citric acid, tartaric acid and lactic acid, and then gelling the injected grout in soil.

A process for strengthening weak ground or stopping leakage of water in ground which comprises injecting various grouts (chemical fluids for injecting into soil) into soil and then gelling the injected grouts in soil has heretofore been known.

Among the grouts used in this process, a so-called silicate grout consisting of an aqueous sodium silicate solution and a gelling agent for gelling the aqueous sodium silicate solution in soil is now widely put to practical use since there is substantially no danger of the silicate grout's causing pollution to the environment.

In general, the aqueous sodium silicate solution is strongly alkaline and is negatively charged. It is known that the solution is easily gelled to form "silica gel" when a positive charge such as an acid (or an acidic salt) or a metal ion is added thereto.

Therefore, various substances such as water-soluble acids, acidic salts thereof and polyvalent metal salts thereof have heretofore been proposed as a gelling agent for the silicate grout. Among them, water-soluble salts (chlorides, sulfates and nitrates) of aluminum, magnesium and iron are preferable since they are safe in handling and do not cause pollution to the environment. However, these gelling agents still have the following defect.

In the actual application of the silicate grout, an aqueous sodium silicate solution and an aqueous solution of a gelling agent are previously separately prepared, and the two solutions are mixed by the use of a Y-tube, and the resulting mixture is injected into soil by a pump. If chlorides, sulfates or nitrates of aluminum, magnesium or iron are used as the gelling agent, a large amount of precipitate (This precipitate is the metal hydroxide formed by the hydrolysis of the gelling agent with the alkalinity of the aqueous sodium silicate solution.) is separated in the mixture and the following troubles are brought about when an aqueous solution of these gelling agents is mixed with an aqueous sodium silicate solution:

1. When the mixture (grout) is injected into soil, the precipitate contained in the mixture is packed in the space between soil particles in the neighborhood of the nozzle of an injection tube and thereby the permeability of the mixture into soil becomes poor.
2. The gel time of the grout (the time until the grout solidify in soil) is prolonged owing to the loss of the gelling agent caused by the formation of the precipitate. Thereby, it is difficult to harden soil rapidly. Also, if the gel time of the grout is long, the strength of the hardened and stabilized soil is weak.
3. The grout does not permeate into soil uniformly, and thereby construction becomes uncertain.

The present invention has been made in order to obviate the above-mentioned defects which are found when chlorides, sulfates or nitrates of aluminum, magnesium and iron are used as a gelling agent for a silicate grout.

Thus, an object of the present invention is to provide a process for stabilizing soil by injecting into soil a mixture of (A) an aqueous sodium silicate solution and (B) at least one compound selected from the group consisting of chlorides, sulfates and nitrates of aluminum, magnesium and iron, and then gelling the mixture in soil, wherein the separation of a large amount of the metal hydroxide in the mixture on mixing of the components (A) and (B) can be prevented.

This object can be accomplished by adding at least one oxy acid selected from the group consisting of citric acid, tartaric acid and lactic acid to any one of the components (A) and (B) and then mixing the components (A) and (B) in the presence of the oxy acid.

As the aqueous sodium silicate solution used in the present invention, sodium silicate which has heretofore been used in silicate grouts may be used.

Commercial sodium silicate is in various forms such as crystals, powder or aqueous solution, but a concentrated viscous aqueous solution of sodium silicate is usually employed as a raw material for silicate grouts.

Table 1

Kinds of Commercial Concentrated Viscous Aqueous Solution of Sodium Silicate
Japanese Industrial Standard (JIS) K-1408

| Test item | Standard Kind | No. 1 Sodium silicate | No. 2 Sodium silicate | No. 3 Sodium silicate |
|---|---|---|---|---|
| Appearance | | Colorless or slightly colored jelly-like liquid | | |
| Specific gravity (15° C, Baume') | | 59 – 61 | 54 – 56 | 41 – 42 |
| $SiO_2$ % | | 35 – 38 | 34 – 36 | 28 – 30 |
| $Na_2O$ % | | 17 – 19 | 14 – 15 | 9 – 10 |
| Molar ratio of $SiO_2/Na_2O$ | | 2.0 – 2.2 | 2.4 – 2.6 | 3.1 – 3.3 |
| Iron (Fe) % | | <0.03 | <0.03 | <0.02 |
| Water-insoluble % | | <0.2 | <0.2 | <0.2 |

Usually, a concentrated viscous aqueous solution of sodium silicate corresponding to JIS No. 3 sodium silicate having a molar ratio of $SiO_2/Na_2O$ of about 3 is most often used as the raw material for the silicate grouts.

The concentrated viscous aqueous solution of sodium silicate is diluted with water before application to adjust its concentration to the value suitable for the object of application. Thus, the concentration of sodium silicate ($SiO_2 + Na_2O$) in the silicate grouts is usually adjusted to a range of 5 to 30% by weight.

In the present invention, chlorides, sulfates or nitrates of aluminum, magnesium and iron such as aluminum chloride, aluminum sulfate, aluminum nitrate, magnesium chloride, magnesium sulfate, magnesium nitrate, ferrous chloride, ferric chloride, ferrous sulfate, ferric sulfate, ferrous nitrate or ferric nitrate are used as a gelling agent for gelling said aqueous sodium silicate solution in soil.

These gelling agents may either be anhydride or have water of crystallization, and are converted to an aqueous solution of a suitable concentration before application. The amount of the gelling agents used may be varied according to the gel time of the grout. If a grout having a short gel time is to be prepared, the amount of the gelling agents should be large. If a grout of a long gel time is to be prepared, the amount of the gelling agents used should be small. In a usual work, however, the amount of the gelling agents used may be 5 to 50% by weight based on the weight of sodium silicate.

A method for injecting the silicate grouts into soil usually comprises mixing an aqueous sodium silicate solution with an aqueous solution of a gelling agent by the use of a Y-tube and then injecting the mixture into soil by a pump. If a chloride, sulfate or nitrate of aluminum, magnesium or iron as the gelling agent is mixed with the aqueous sodium silicate solution, these salts are hydrolyzed to the corresponding metal hydroxide by the alkalinity (usually pH 11 or more) of the aqueous sodium silicate solution. Thus, a large amount of the metal hydroxide precipitate is formed in the mixture.

According to the present invention, citric acid, tartaric acid or lactic acid is added to the mixture to prevent the separation of such metal hydroxide precipitate.

Thus, the separation of the metal hydroxide precipitate on mixing of the two solutions can be effectively prevented by adding a suitable amount of citric acid, tartaric acid or lactic acid to any one of the aqueous solution of the gelling agent and the aqueous sodium silicate solution before mixing.

The working mechanism of citric acid, tartaric acid or lactic acid is considered to be as follows:

It is known that oxy acids (hydroxycarboxylic acids) such as citric acid, tartaric acid and lactic acid generally have so-called chelating action, that is, are bonded to many metal ions present in water to form a water-soluble complex compound. If these oxy acids are present in a mixture of an aqueous sodium silicate solution and an aqueous solution of a water-soluble salt of aluminum, magnesium or iron, these oxy acids form a stable water-soluble complex compound of each metal ion and thereby the metal hydroxide is not formed.

Many compounds other than citric acid, tartaric acid and lactic acid belong to oxy acids, but do not show the effect of preventing the formation of a metal hydroxide precipitate even if they are added to the mixture of an aqueous sodium silicate solution and an aqueous solution of a gelling agent which is used in the present invention. Also, polyaminocarboxylic acids such as E. D. T. A. (ethylenediaminetetraacetic acid) or N. T. A. (nitrilotriacetic acid) which are well known as an effective chelating agent do not show such an effect.

Thus, chelating agents other than citric acid, tartaric acid and lactic acid are not considered to be able to form a stable water-soluble complex compound with each metal ion in a mixture of an aqueous sodium silicate and an aqueous solution of a chloride, sulfate or nitrate of aluminum, magnesium or iron.

The amount of citric acid, tartaric acid or lactic acid used may be varied according to the amount of a metal hydroxide precipitate separated when the aqueous sodium silicate solution is mixed with the aqueous solution of the gelling agent. The amount should be large if the amount of the precipitate separated is large. Also, the amount should be small if the amount of the precipitate separated is small.

Usually, the amount of the metal hydroxide precipitate separated is large when the amount of the gelling agent used is large. The amount separated is small when the amount of the gelling agent used is small.

Therefore, the amount of citric acid, tartaric acid or lactic acid used should be large when the amount of the gelling agent used is large. The amount of the oxy acid used should be small when the amount of the gelling agent used is small. However, the oxy acid is usually used at a ratio of 0.5 to 20 moles per mole of the gelling agent.

Among citric acid, tartaric acid and lactic acid, citric acid can produce the largest effect. For example, when magnesium sulfate is used as a gelling agent, the use of 0.5 to 1 mole of citric acid per mole of magnesium sulfate can give a satisfactory effect. If tartaric acid or lactic acid is used as a gelling agent, the amount of these oxy acids used should be larger than that of citric acid.

Citric acid, tartaric acid or lactic acid may be added to any one of an aqueous sodium silicate solution and an aqueous solution of a gelling agent. Since these oxy acids are weak acids, however, there is the possibility that the aqueous sodium silicate solution gels when a large amount of these oxy acids are added to said aqueous solution and the mixture is allowed to stand. Therefore, it is usually preferable to add citric acid, tartaric acid or lactic acid to an aqueous solution of a gelling agent. Also, since an aqueous sodium silicate solution can be gelled by the use of a large amount of citric acid, tartaric acid or lactic acid as described above, an amount of these oxy acids larger than enough to prevent the separation of the metal hydroxide precipitate may be used to prepare a grout having a short gel time.

The process for the stabilization of soil according to the present invention is the same as the prior art process. Thus, an aqueous sodium silicate solution and an aqueous solution of a gelling agent containing an oxy acid dissolved therein are separately prepared, and the two solutions are mixed by the use of a Y-tube on application, and the mixture is then injected into soil by a pump. According to the present invention, a clear grout free from the metal hydroxide precipitate can be injected into soil. Therefore, the above-mentioned various troubles caused by the separation of the metal hydroxide precipitate can be obviated and soil can be advantageously stabilized according to the present invention.

The following examples illustrate the present invention.

EXAMPLES 1 – 9

A commercial concentrated viscous aqueous solution of sodium silicate (specific gravity 1.386, 20° C) corresponding to No. 3 sodium silicate as prescribed in Japanese Industrial Standard (JIS) K-1408 was diluted with water to prepare an aqueous solution having $SiO_2$ — $Na_2O$ content of 17% by weight. The solution is referred to as "A solution".

On the one hand, aqueous solutions of mixtures of a chloride, sulfate or nitrate of aluminum, magnesium or iron and citric acid, tartaric acid or lactic acid having different concentrations as described in Tables 2–6 were prepared. These solutions each are referred to as "B solution".

Each 65 ml of A and B solutions were mixed. The property (formation of precipitate), gel time and degree of soil hardening of the mixture were measured. The test results obtained are shown in Tables 2–6.

The soil hardening test was carried out by mixing the mixture of each 50 ml of A and B solutions with 660 g of standard sand, gelling the mixture, allowing the solidified mixture to stand for 24 hours, and measuring its monoaxial compressive strength.

For comparison, the test results obtained when no chelating agent was used and when citric acid, tartaric acid or lactic acid was replaced by the other oxy acids or polyaminocarboxylic acids are also shown in Tables 2–6.

As is clear from the description of Tables 2–6, no metal hydroxide precipitate was observed in the mixture of A and B solutions, the gel time of the mixture was short even on the use of a small amount of a gelling agent, and the strength of the treated soil (sand) was high when citric acid, tartaric acid or lactic acid was used according to the present invention. It was in contrast with the use of the other oxy acids or polyaminocarboxylic acids.

Table 2

Composition of injecting grout (% by weight)

| | | A solution | | | B solution | | |
|---|---|---|---|---|---|---|---|
| | | $SiO_2$ + $Na_2O$ | Water | Gelling agent | Chelating agent | | Water |
| Example 1 | Process of this invention | 17 | 83 | $AlCl_3.6H_2O$ | 2.5 | Citric acid | 3.3 | 94.2 |
| | | ″ | ″ | ″ | 2.5 | Tartaric acid | 3.0 | 94.5 |
| | | ″ | ″ | ″ | 1.5 | Lactic acid | 5.0 | 93.3 |
| | | ″ | ″ | ″ | 7.5 | — | | 92.5 |
| | Control | ″ | ″ | ″ | 1.5 | Glycolic acid | 5.0 | 93.5 |
| | | ″ | ″ | ″ | 1.5 | EDTA 4 Na salt | 5.0 | 93.5 |
| Example 2 | Process of this invention | ″ | ″ | $Al_2(SO_4)_3.16$-$18 H_2O$ | 3.0 | Citric acid | 5.0 | 92.0 |
| | | ″ | ″ | ″ | 2.0 | Tartaric acid | 5.5 | 92.5 |
| | | ″ | ″ | ″ | 2.5 | Lactic acid | 5.0 | 92.5 |
| | | ″ | ″ | ″ | 15.0 | — | | 85.0 |
| | Control | ″ | ″ | ″ | 2.5 | Malic acid | 5.0 | 92.5 |
| | | ″ | ″ | ″ | 2.5 | NTA 2 Na salt | 5.0 | 92.5 |

| | | Test results | | Monoaxial compressive strength of sand gel ($kg/cm^2$) |
|---|---|---|---|---|
| | | 1 : 1 Mixture of A and B solutions | | |
| | | Property | Gel time (min. Sec., 20° C) | |
| Example 1 | Process of this invention | No precipitate | 2' 30″ | 3.8 |
| | | ″ | 3' 25″ | 3.9 |
| | | ″ | 4' 50″ | 3.3 |
| | | Much white precipitate formed | 12' | 1 – 2 |
| | | ″ | >120' | <1 |
| | Control | ″ | ″ | ″ |
| | | ″ | ″ | ″ |
| Example 2 | Process of this invention | No precipitate | 2' 50″ | 3.9 |
| | | ″ | 3' | 3.5 |
| | | ″ | 4' 30″ | 3.2 |
| | | Much white precipitate formed | 16' | 1 – 2 |
| | | ″ | >120' | <1 |
| | Control | ″ | ″ | ″ |

Table 3

Composition of injecting grout (% by weight)

| | | A solution | | | B solution | | |
|---|---|---|---|---|---|---|---|
| | | $SiO_2$ + $Na_2O$ | Water | Gelling agent | Chelating agent | | Water |
| Example 3 | Process of this invention | 17 | 83 | $Al(NO_3)_3.9H_2O$ | 4.0 | Citric acid | 3.0 | 93.0 |
| | | ″ | ″ | ″ | 1.5 | Tartaric acid | 5.0 | 93.5 |
| | | ″ | ″ | ″ | 2.5 | Lactic acid | 5.0 | 92.5 |
| | | ″ | ″ | ″ | 7.5 | — | | 92.5 |
| | Control | ″ | ″ | ″ | 2.0 | Malic acid | 5.0 | 93.0 |
| | | ″ | ″ | ″ | 2.0 | EDTA 4 Na salt | 5.0 | 93.0 |
| Example 4 | Process of this invention | ″ | ″ | $MgCl_2.6H_2O$ | 3.0 | Citric acid | 2.5 | 94.5 |
| | | ″ | ″ | ″ | 2.0 | Tartaric acid | 3.8 | 94.2 |
| | | ″ | ″ | ″ | 1.0 | Lactic acid | 6.0 | 93.0 |
| | | ″ | ″ | $MgCl_2.6H_2O$ | 9.0 | — | | 91.0 |
| | Control | ″ | ″ | ″ | 1.0 | Glycolic acid | 5.0 | 94.0 |
| | | ″ | ″ | ″ | 1.0 | NTA 2 Na salt | 5.0 | 94.0 |

|  |  | Test results | | Monoaxial compressive strength of sand gel (kg/cm²) |
|---|---|---|---|---|
|  |  | 1:1 mixture of A and B solutions | | |
|  |  | Property | Gel time (min. sec., 20°C) | |
| Example 3 | Process of this invention | No precipitate | 4' 30" | 3.3 |
|  |  | " | 2' | 4.3 |
|  |  | " | 4' 30" | 3.5 |
|  |  | Much white precipitate formed | 8' | 1 – 2 |
|  | Control | " | >120' | <1.0 |
|  |  | " | " | " |
| Example 4 | Process of this invention | No precipitate | 2' | 4.6 |
|  |  | " | 2' 20" | 4.5 |
|  |  | " | 2' | 4.7 |
|  |  | Much white precipitate formed | 9' | 1 – 2 |
|  | Control | " | >120' | <1.0 |
|  |  | " | " | " |

Table 4

|  |  | Composition of injecting grout (% by weight) | | | | | | |
|---|---|---|---|---|---|---|---|---|
|  |  | A solution | | | | B solution | | |
|  |  | SiO₂ + Na₂O | Water | Gelling agent | | Chelating agent | | Water |
| Example 5 | Process of this invention | 17 | 83 | MgSO₄.7H₂O | 5.0 | Citric acid | 2.5 | 92.5 |
|  |  | " | " | " | 2.5 | Tartaric acid | 5.0 | 92.5 |
|  |  | " | " | " | 3.0 | Lactic acid | 5.0 | 92.0 |
|  |  | " | " | " | 8.5 | — | | 91.5 |
|  | Control | " | " | " | 5.0 | Malic acid | 5.0 | 90.0 |
|  |  | " | " | " | 5.0 | EDTA 4 Na salt | 5.0 | 90.0 |
| Example 6 | Process of this invention | " | " | Mg(NO₃)₂.6H₂O | 4.0 | Citric acid | 3.0 | 93.0 |
|  |  | " | " | " | 4.0 | Tartaric acid | 3.0 | 93.0 |
|  |  | " | " | " | 4.0 | Lactic acid | 3.0 | 93.0 |
|  |  | " | " | " | 9.0 | — | | 91.0 |
|  | Control | " | " | " | 4.0 | Malic acid | 5.0 | 91.0 |
|  |  | " | " | " | 4.0 | NTA 2 Na salt | 5.0 | 91.0 |

|  |  | Test results | | Monoaxial Compressive strength of sand gel (kg/cm²) |
|---|---|---|---|---|
|  |  | 1:1 Mixture of A and B solutions | | |
|  |  | Property | Gel time (min. sec., 20°C) | |
| Example 5 | Process of this invention | No precipitate | 2' 30" | 4.0 |
|  |  | " | 3' | 3.9 |
|  |  | " | 2' 30" | 4.2 |
|  |  | Much white precipitate formed | 7' | 1 – 2 |
|  | Control | " | >120' | <1 |
|  |  | " | " | " |
| Example 6 | Process of this invention | No precipitate | 4' 20" | 3.4 |
|  |  | " | 2' 30" | 4.3 |
|  |  | " | 4' 30" | 3.6 |
|  |  | Much white precipitate formed | 10' | 1 – 2 |
|  | Control | " | >120' | <1 |
|  |  | " | " | " |

Table 5

|  |  | Composition of injecting grout (% by weight) | | | | | | |
|---|---|---|---|---|---|---|---|---|
|  |  | A solution | | | | B solution | | |
|  |  | SiO₂ + Na₂O | Water | Gelling agent | | Chelating agent | | Water |
| Example 7 | Process of this invention | 17 | 83 | FeCl₃.6H₂O | 3.0 | Citric acid | 3.0 | 94.0 |
|  |  | " | " | " | 2.5 | Tartaric acid | 3.3 | 94.2 |
|  |  | " | " | " | 3.0 | Lactic acid | 4.0 | 93.0 |
|  |  | " | " | " | 8.3 | — | | 91.7 |
|  | Control | " | " | " | 2.5 | Malic acid | 5.0 | 92.5 |
|  |  | " | " | " | 2.5 | NTA 2 Na salt | 5.0 | 92.5 |
| Example 8 | Process of this invention | " | " | FeSO₄.7H₂O | 2.5 | Citric acid | 5.0 | 92.5 |
|  |  | " | " | " | 3.0 | Tartaric acid | 5.0 | 91.5 |
|  |  | " | " | " | 3.5 | Lactic acid | 5.5 | 91.5 |
|  |  | " | " | " | 6.0 | — | | 94.0 |

Table 5-continued

| | | Composition of injecting grout (% by weight) | | | | | |
|---|---|---|---|---|---|---|---|
| | | A solution | | | B solution | | |
| | | $SiO_2 + Na_2O$ | Water | Gelling agent | Chelating agent | | Water |
| | Control | " | " | " | 3.5 | Glycolic acid | 5.0 | 91.5 |
| | | " | " | " | 5.0 | EDTA 4 Na salt | 5.0 | 90.0 |

| | | Test results | | Monoaxial compressive strength of sand gel (kg/cm²) |
|---|---|---|---|---|
| | | 1 : 1 Mixture of A and B solutions | | |
| | | Property | Gel time (min. sec., 20° C) | |
| Example 7 | Process of this invention | No precipitate | 2' 30" | 4.5 |
| | | " | 2' 45" | 4.2 |
| | | " | 2' 30" | 4.4 |
| | | Much white precipitate formed | 15' | 1 – 2 |
| | Control | " | >120' | <1 |
| Example 8 | Process of this invention | No precipitate | 4' 10" | 3.3 |
| | | " | 3' | 3.8 |
| | | " | 2' | 4.5 |
| | | Much white precipitate formed | 12' | 1 – 2 |
| | Control | " | >120' | <1 |

Table 6

| | | Composition of injecting grout (% by weight) | | | | | |
|---|---|---|---|---|---|---|---|
| | | A solution | | | B solution | | |
| | | $SiO_2 + Na_2O$ | Water | Gelling agent | Chelating agent | | Water |
| Example 9 | Process of this invention | 17 | 83 | $Fe(NO_3)_3 \cdot 9H_2O$ | 3.0 | Citric acid | 3.5 | 93.5 |
| | | " | " | " | 3.5 | Tartaric acid | 4.0 | 92.5 |
| | | " | " | " | 2.0 | Lactic acid | 5.0 | 93.0 |
| | | " | " | " | 8.0 | — | | 92.0 |
| | Control | " | " | " | 2.0 | Glycolic acid | 5.0 | 93.0 |
| | | " | " | " | 2.0 | EDTA 4 Na salt | 5.0 | 93.0 |

| | | Test results | | Monoaxial Compressive strength of Sand gel (Kg/cm²) |
|---|---|---|---|---|
| | | 1 : 1 Mixture of A and B solutions | | |
| | | Property | Gel time (min. sec., 20 °C) | |
| Example 9 | Process of this invention | No precipitate | 3' 50" | 3.5 |
| | | " | 2' 10" | 4.2 |
| | | " | 4' 10" | 3.8 |
| | Control | Much white precipitate formed | 9' 50" | 1 – 2 |
| | | " | >120' | <1 |

What is claimed is:

1. In a process for stabilizing soil which comprises injecting into soil a grout mixture consisting of (A) an aqueous sodium silicate solution having a pH of at least 11 wherein the molar ratio of $SiO_2/Na_2O$ is 3.1 to 3.3:1 and (B) an aqueous solution of at least one gelling agent selected from the group consisting of chlorides, sulfates and nitrates of aluminum, magnesium and iron, and then gelling the injected soil mixture in soil, the improvement characterized by adding (C) at least one oxy acid selected from the group consisting of citric acid, tartaric acid and lactic acid to any one of the components (A) and (B) wherein the amount of component (C) used is 0.5 to 20 moles per mole of the gelling agent in (B) and the amount of the gelling agent in (B) is 5 to 50% of the sodium silicate by weight.

2. A process according to claim 1, wherein the component (C) is citric acid.

3. A process according to claim 1 wherein for each 100 ml total of the grout mixture of (A), (B) and (C) the amount of $SiO_2 - Na_2O$ present is equal to that present in 50 ml of a 17% by weight aqueous solution of $SiO_2 - Na_2O$ having a specific gravity of 1.386 and a molar ratio of $SiO_2/Na_2O$ of from 3.1 to 3.3:1.

4. A process according to claim 3 where component (C) is citric acid and there is used 0.5 to 1 mole of citric acid per mole of the gelling agent in (B).